Figure 1:
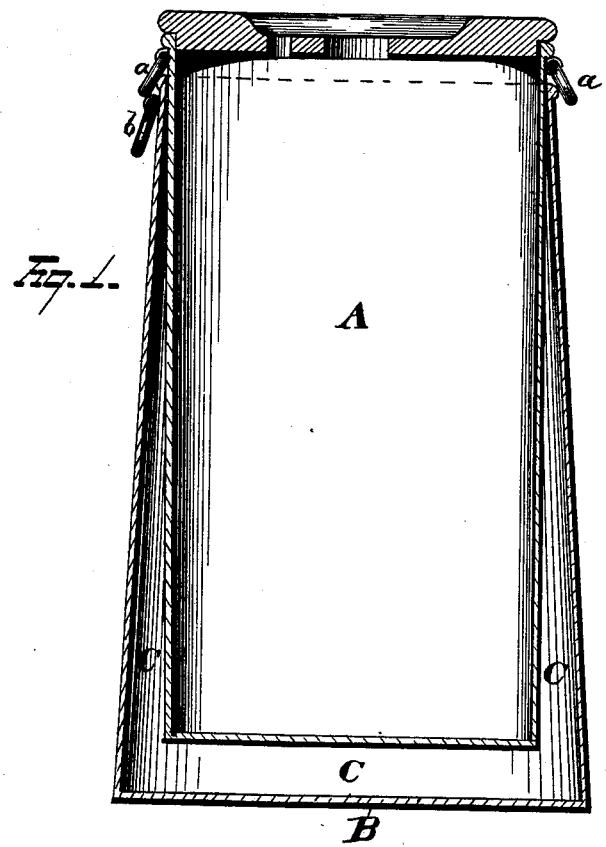

2 Sheets—Sheet 1.

J. CLINEDINST.
RECIPROCATING CHURN.

No. 190,705. Patented May 15, 1877.

WITNESSES
Ed. J. Nottingham
A. W. Bright

INVENTOR
Jacob Clinedinst.
By Leggett and Leggett.
ATTORNEYS

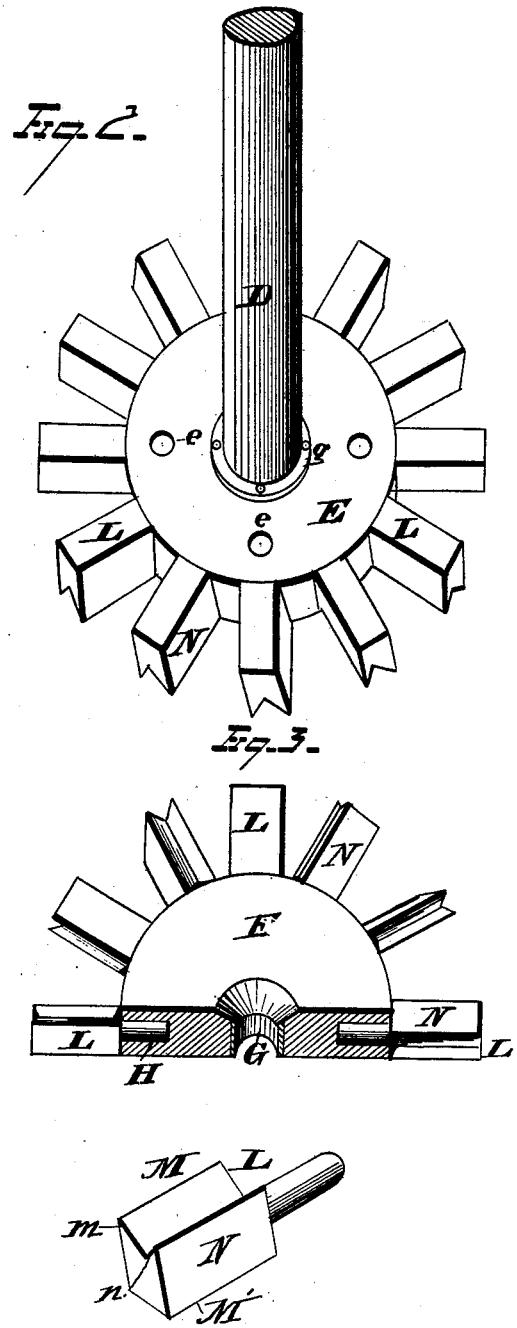

UNITED STATES PATENT OFFICE.

JACOB CLINEDINST, OF GORDONSVILLE, VIRGINIA.

IMPROVEMENT IN RECIPROCATING CHURNS.

Specification forming part of Letters Patent No. 190,705, dated May 15, 1877; application filed March 24, 1877.

*To all whom it may concern:*

Be it known that I, JACOB CLINEDINST, of Gordonsville, in the county of Orange and State of Virginia, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification.

My invention relates to certain improvements in churns; and is designed to furnish a simple and cheap mechanism for churning butter, which shall be so constructed as to enable me to readily control the temperature of the cream under any atmospheric variation, and, at the same time, produce a sweet article of butter in a minimum length of time.

The desirability of a churn made of tin or other metal is affected and interfered with by the tendency of the cream to gather or stick to the sides of the same, instead of leaving the latter free from all clogging of the cream. This disadvantage is overcome by surrounding or incasing the metallic churn with a body of water which may be varied in its temperature to regulate that of the cream, so that the latter may be maintained at just the right degree of temperature to form butter and prevent the little fatty sacs or vesicles from coagulating about the sides of the churn.

My churn is made with an inner can of tin or other close-bodied metallic vessel suitable for containing the cream, and a second outer vessel or can, the latter made either of metal or wood, and forming, between the two, a chamber or space, which is filled with water, thus surrounding the cream by a jacket of water, which is either hot or cold, corresponding to the degree of temperature desired to be produced in the cream in order to bring the latter quickly to butter.

The dasher which reciprocates in this churn consists of a wooden disk whose periphery is provided with an annular series of radial arms or wings, constructed so that they may be adjustably set with their greater cross-dimensions at any desired angle of inclination to the horizontal plane of the disk. Thus the aggregate surface of force brought to bear upon the cream at each stroke of the dash may be made either greater or less accordingly as may be desired. These detachable and adjustable arms are made each with its working edge longitudinally grooved or channeled, so as to present a double cutting-edge in its action upon the cream.

Referring to the drawings, Figure 1 is a vertical section of my churn. Fig. 2 shows the churn-dasher with its handle, and Fig. 3 is a reverse view of the dasher in section.

The churn is a double shell, made of the inner metallic can or vessel A, for receiving the cream, and the outer or second vessel, B, in which latter the cream-can sets loosely, so as to form the annular water-chamber C between the two. In this chamber water is introduced of any suitable temperature, so as to raise or lower, in any desired degree, the temperature of the cream, thus reducing the latter to the required state of temperature, in order to quickly and favorably convert it into butter. Ring-handles $a$ and $b$ are respectively provided on each of these two cans or vessels, and while the inner or cream can is, in all instances, made of metal, the outer or water vessel may be either metal or wood. By this construction, as before referred to, the cream is kept from gathering or coagulating about the sides of its chamber, and the whole is constantly in motion. The dasher is provided with any suitable handle, D, connected to the disk E, at the latter's center, by screw, bayonet-joint, or other similar engaging mechanism. The central slot $f$ of this disk E is preferably provided with a metallic collar or bearing, G, which may or may not be made with the annular flange $g$ serving as a washer between the handle and the upper face of the disk, coming in contact with the engaging end of the same. Circular apertures or perforations $e$ are made right-angularly through the horizontal body of the disk E, which permit the cream to pass through them, while the periphery of the disk is provided with an annular series of mortises, H, in which the tenoned extremities of the radial arms L engage, and they may be of any desired number.

Each radial arm L is made as an oblong parallelogram, having their side edges M M' beveled or inclined at an angle approximately of forty-five degrees, more or less. The lower or working edge M is made with a longitudinal groove or channel, the two transverse sides of which are of different vertical length, the one lettered *m* being about twice that of its counterpart lettered *n*. This construction not only presents a double cutting-edge to the cream in the vertical dash of each arm, but also carries air down into the body of the cream, thus causing the little fatty sacs or vesicles containing the butter element to be opened by, and charged with, the air in this way carried down to them, and hence aiding in their direct and ready conversion into butter. These arms are adjustable on the periphery of the disk, since their tenoned extremities can readily turn in their engaging mortises, and cause them to be presented at any angular inclination to the surface-body of the cream. If a severe agitation is desired, they are set so that their faces N of greatest cross dimension are brought well against the cream, while if the process of agitation is to be milder and less active, then the faces N assume a greater vertical inclination, and the working edge M tends more to a horizontal line.

Having fully described my invention, what I claim as new, and desire to secure by Letters Patent, is—

1. A double-shell churn constructed with two independent vessels or cans, the same being readily detachable, substantially as described.

2. The dasher, consisting of the perforated disk, provided with detachable radial arms, which latter may be adjusted at any desired angular inclination thereto, the said arms having double cutting-edges of unequal vertical length on their respective working faces, substantially as described.

In testimony that I claim the foregoing I have hereunto set my hand this 23d day of March, 1877.

JACOB CLINEDINST.

Witnesses:
FRANK GALT,
THOMAS B. HALL.